United States Patent [19]
Knapp

[11] Patent Number: 5,883,605
[45] Date of Patent: Mar. 16, 1999

[54] AUTOMATIC ELECTROCHROMIC CONTROL OF LIGHT LEVEL OF VACUUM FLUORESCENT DISPLAY

[75] Inventor: Robert C. Knapp, Coloma, Mich.

[73] Assignee: Gentex Corporation, Zeeland, Mich.

[21] Appl. No.: 611,332

[22] Filed: Mar. 8, 1996

Related U.S. Application Data

[63] Continuation-in-part of Ser. No. 442,475, May 16, 1995, abandoned, which is a continuation of Ser. No. 250,092, May 26, 1994, abandoned, which is a continuation of Ser. No. 57,439, May 4, 1993, abandoned, which is a continuation of Ser. No. 840,852, Feb. 25, 1992, abandoned.

[51] Int. Cl.⁶ ..................................................... G09G 5/00
[52] U.S. Cl. .............................. 345/7; 345/102; 359/603; 359/604
[58] Field of Search ............................... 345/7, 74, 8, 87, 345/102, 9; 359/13, 603, 630, 604

[56] References Cited

U.S. PATENT DOCUMENTS

| | | | |
|---|---|---|---|
| 1,908,767 | 5/1933 | Hodny | 359/603 |
| 4,917,477 | 4/1990 | Bechtel et al. | 359/603 |
| 5,081,451 | 1/1992 | Takekawa et al. | 345/75 |
| 5,428,265 | 6/1995 | Booth, Jr. et al. | 315/158 |
| 5,576,687 | 11/1996 | Blank et al. | 359/630 |

*Primary Examiner*—Richard A. Hjerpe
*Assistant Examiner*—Kent Chang
*Attorney, Agent, or Firm*—Malcolm R. McKinnon

[57] ABSTRACT

A vehicle having instrumentation indicative of parameters associated with the operation of the vehicle, which instrumentation includes variable intensity light emitting elements whereby the instrumentation will be appropriately displayed to the vehicle operator. A light sensing control system is provided for sensing varying light level conditions and generating corresponding electrical signals indicative of the varying light levels. The control system is responsive to the electrical signals and effective to vary the intensity of the light emitting elements over a range as a function of the varying light levels so that the instrumentation will remain visible to the vehicle operator, but not at a distracting brightness to the vehicle operator, during variable light level conditions. Another feature of the invention is the provision of a control for adjusting the intensity of the light emitting elements independently of glare causing light levels.

3 Claims, 5 Drawing Sheets

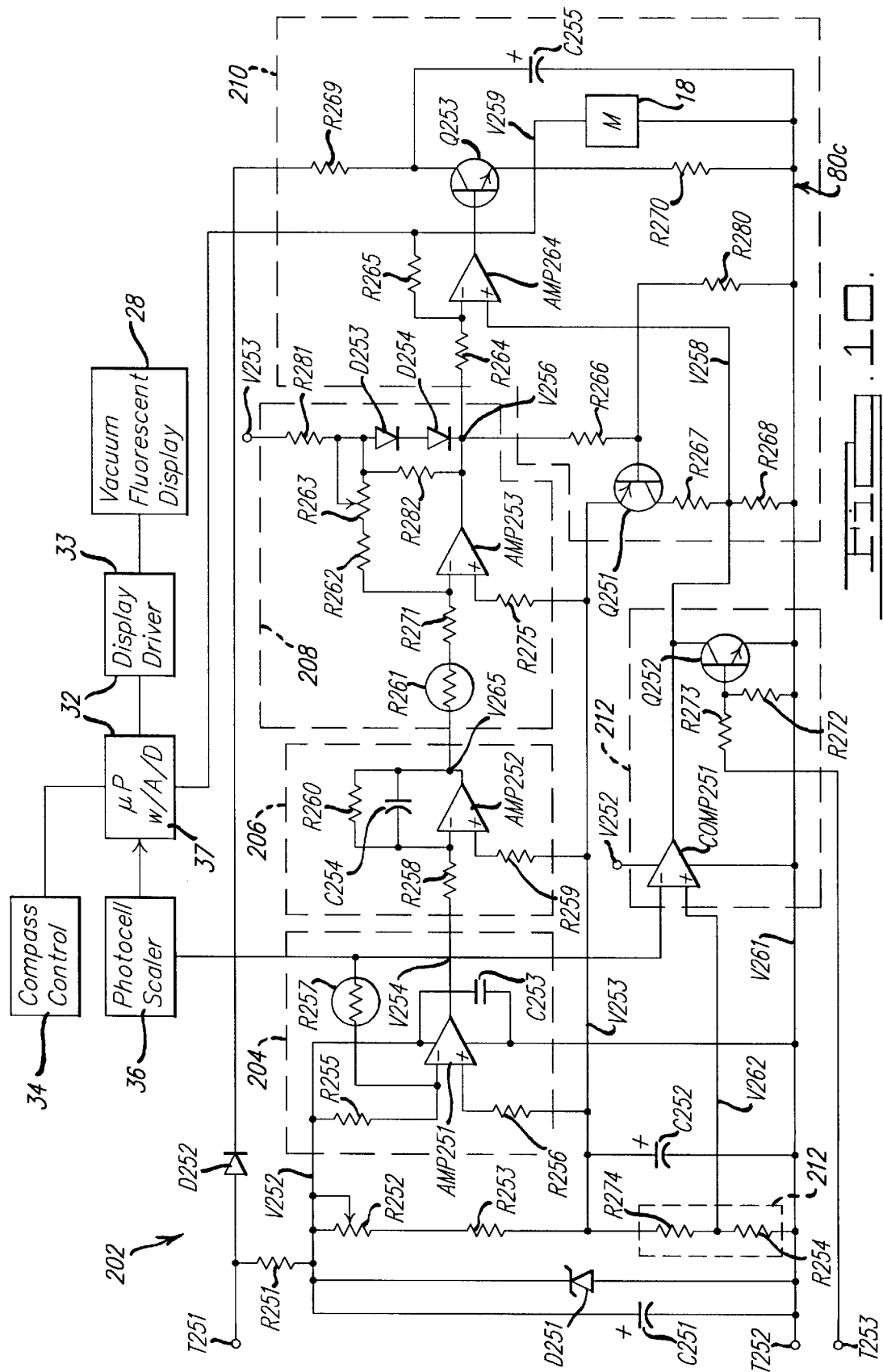

AUTOMATIC ELECTROCHROMIC CONTROL OF LIGHT LEVEL OF VACUUM FLUORESCENT DISPLAY

This application is a continuation-in-part of U.S. Ser. No. 08/442,475, filed May 16, 1995, now abandoned, which is a continuation of U.S. Ser. No. 08/250,092, filed May 26, 1994, now abandoned, which is a continuation of U.S. Ser. No. 08/057,439, filed May 4, 1993, now abandoned, which is a continuation of U.S. Ser. No. 07/840,852, filed Feb. 25, 1992, now abandoned.

FIELD OF THE INVENTION

This invention relates to a variable intensity light emitting instrumentation system on a vehicle and, more particularly, to an electronic control system for adjusting the intensity of light emitting instrumentation to compensate for electrochromic control features through which the light emitting instrumentation is visible, and to light sensing means adapted to control and vary the intensity of the light emitting elements of the aforesaid instrumentation system over a range as a function of light levels so that as the light levels vary, the intensity of the light emitting elements will also vary whereby the instrumentation system will remain visible to the vehicle operator but not distracting to the vehicle operator during changing light level conditions.

BACKGROUND OF THE INVENTION

The invention disclosed herein is related to the technology disclosed in U.S. Pat. No. 4,917,477, which is owned by the assignee of the present invention, and the aforesaid U.S. patent is to be considered incorporated herein by reference.

Recent advances in electronic technology, particularly the packaging of modules into smaller spaces, has the automobile manufacturers requesting more information type modules to be oriented at various and convenient locations inside the vehicle. It is oftentimes desirable by the automobile manufacturer to have the aforesaid information modules, such as an automatic calibrating compass, clock, temperature and other type modules oriented in locations other than the instrument panel on the dashboard, such as in overhead consoles and the like. Such locations of the information type modules will then provide more space for other modules in either the instrument panel on the dashboard or even in the overhead console. One such location for information type modules is the rearview mirror because it allows for easier viewing of the display without the driver removing his/her eyes from the road. One known unlighted display on an externally mounted rearview mirror is disclosed in U.S. Pat. No. 1,528,082. There, nevertheless, exists problems associated with locating lighted information type modules in a rearview mirror environment. Primarily there would be substantial additional cost to the automobile manufacturer because they would have to run additional wires from the instrument panel on the dashboard to enable the light intensity of the light emitting elements of lighted type information type modules to be controlled so as to render the intensity thereof reduced during nighttime driving, for example, and render them non-distractive to the vehicle driver. Further, if such lighted information type modules are embodied in the rearview mirror environment, the provision of electrochromic layer transmissive attenuation, as described in the aforementioned U.S. Pat. No. 4,917,477, will diminish the light intensity of the light emitting elements during glare conditions. Thus, heretofore, the rearview mirror environment was not deemed to be an appropriate environment for lighted information type modules, especially in mirror constructions embodying electrochromic layer transmissive attenuation capabilities.

Another factor to be considered in orienting a lighted information type display in a rearview mirror environment is that a vacuum fluorescent lighting element would create a problem in safety, namely, the intensity of the vacuum fluorescent display would be distracting to the driver. That is, the readout value of the lighted information type display must be visible through the electrochromic layer as well as be comprehended by the driver. Yet, the display should not be too bright in order to distract the driver's attention from viewing the road forward and rearward. The amount of distraction will increase during nighttime driving because the ratio of light changing from day to night light condition is approximately one million to one, and the display intensity will be immensely brighter to the driver's eyes during the night condition, especially if there is no compensation for the intensity of the information displayed in the rearview mirror setting.

Accordingly, it is an object of this invention to provide a light sensing control system for controlling the intensity of the light emitting elements of the vehicle instrumentation visible to the vehicle operator over a range as a function of light levels so that as the light levels vary, the intensity of the light emitting elements will also vary whereby the instrumentation will remain visible at all times to the vehicle operator, but not at an intensity that would be considered distracting to the vehicle operator during variable light conditions.

Another object of the invention is to provide an improved electro-optic rearview mirror incorporating improved control circuitry whereby the luminance of a light emitting display embodied in the mirror varies with respect to the light transmittance of the electro-optics.

Another object of the invention is to provide an improved electro-optic rearview mirror incorporating improved control circuitry whereby the luminance of a vacuum fluorescent display embodied in the mirror varies inversely with respect to glare light levels impinging on the mirror.

Another object of the invention is to provide an improved electro-optic rearview mirror incorporating improved control circuitry whereby the luminance of a light emitting display embodied in the mirror varies directly with respect to ambient light levels.

Another object of the invention is to provide an improved electro-optic rearview mirror incorporating improved control circuitry whereby the luminance of a light emitting display embodied in the mirror varies inversely with respect to the levels of glare light impinging on the mirror and whereby the luminance of the display may be modified independently of the glare light levels impinging on the mirror.

It is a further object of this invention to provide an ambient light sensing control for varying the intensity of light emitting elements on instrumentation mounted on a rearview mirror assembly of a vehicle.

It is a further object of this invention to provide a light sensing control, as aforesaid, wherein electrochromic means is mounted in front of the light emitting elements of the vehicle instrumentation system so that the light absorption characteristic of the electrochromic means can effect a varying of the intensity of the light emitting elements visible therethrough to the vehicle operator.

SUMMARY OF THE INVENTION

The objects and purposes of the invention are met by providing, in a vehicle having instrumentation indicative of the parameters associated with the operation of the vehicle, which instrumentation includes variable intensity light emitting elements so that the instrumentation will be appropriately displayed to the vehicle operator, a light sensing control system for sensing varying light conditions and generating corresponding electrical signals indicative of varying light levels, means for controlling the light intensity of the light emitting elements and responsive to the electrical signals for varying the intensity of the light emitting elements visible to the vehicle operator over a range as a function of the varying light levels so that as the light levels change, the intensity of the light emitting elements will also change whereby the instrumentation will remain visible to the vehicle operator but not at a distracting brightness to the vehicle operator during variable light conditions. Another feature of the invention is the provision of a control for adjusting the intensity of the light emitting elements to compensate for the electrochromic control layer through which the light is visible.

BRIEF DESCRIPTION OF THE DRAWINGS

Other objects and purposes of the invention will become apparent to persons skilled in this art upon reading the following specification with reference to the accompanying drawings, in which:

FIG. 10 is a schematic block diagram illustration of an alternative design for a mirror transmissivity and display intensity control system of this invention.

DETAILED DESCRIPTION

Figure 4:
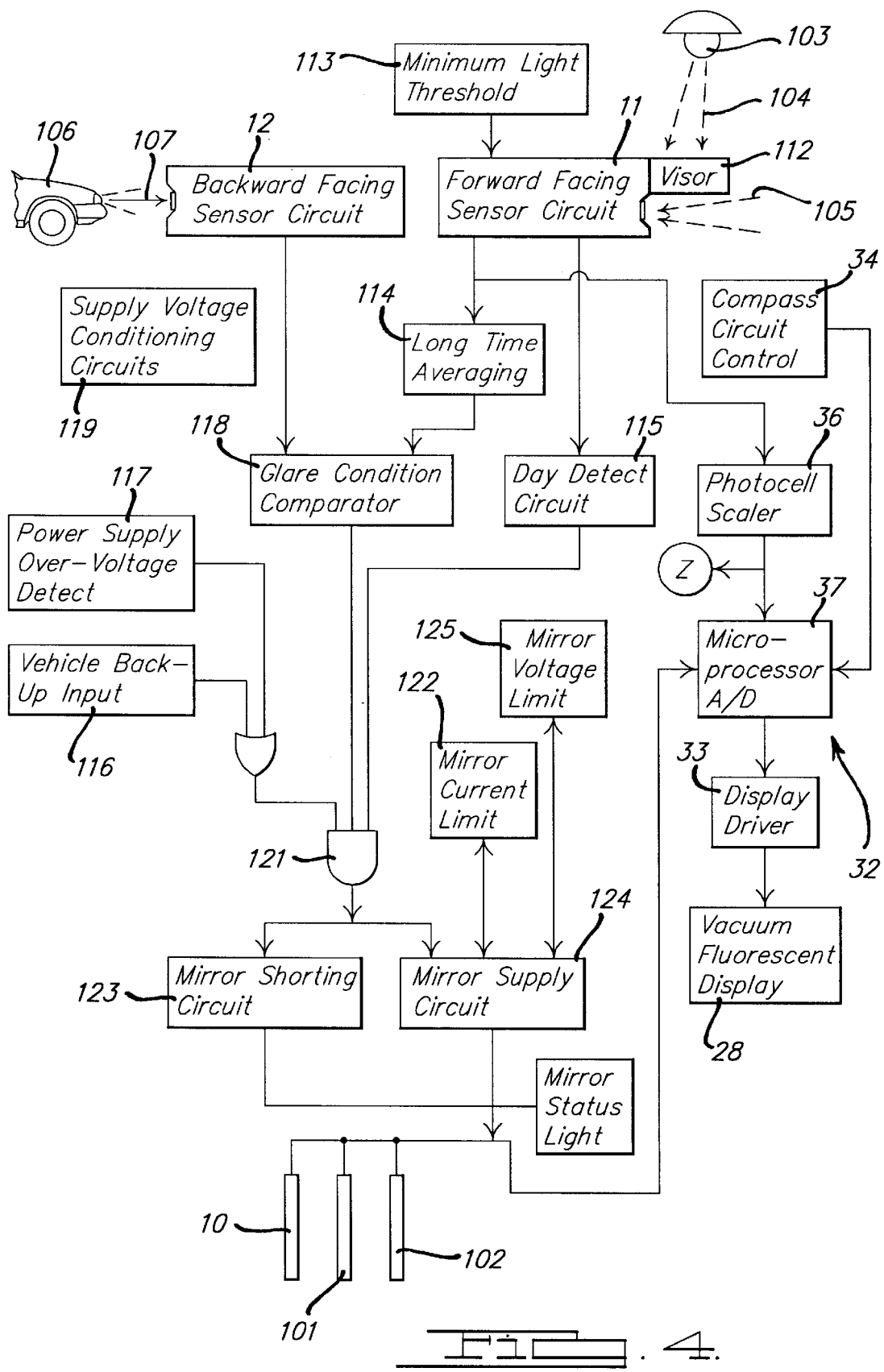
FIG. 4 is a schematic block diagram of an operative system for controlling the intensity of the light emitting elements on a vehicle instrumentation system in response to varying light conditions.

The automatic electrochromic mirror 10 herein disclosed is of the type disclosed in the aforementioned U.S. Pat. No. 4,917,477, which, as stated above, is to be considered incorporated herein by reference. The mirror 10 includes circuitry generally depicted in FIG. 4 for automatically controlling the reflectance of the mirror to provide maximum rear vision while giving relief to the driver from glare which is caused by headlights from the next following vehicle during night driving. The ambient and glare-causing light levels observed by the driver of the vehicle are monitored by a pair of photosensors 11 and 12 (FIG. 4) located in the mirror assembly. The electronic circuit shown in FIG. 4 is provided within the mirror assembly and processes the light level information and serves to properly energize the electrochromic layer when glare relief is required.

Figure 3:
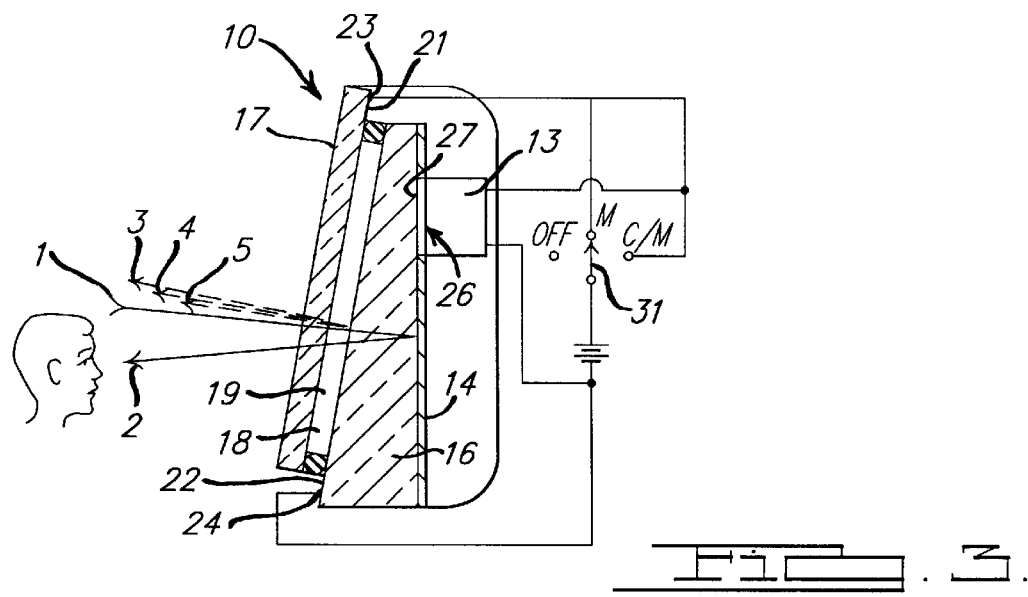
FIG. 3 is a highly schematic sectional view taken generally along the line 3—3 of FIG. 2.

Referring to FIG. 3, the mirror 10 includes a reflective layer 14 provided on a rear surface of a mirror glass layer 16. A front cover glass 17 is provided in front of the mirror glass layer 16 and oriented therebetween is an electrochromic layer 18. Reflective glass layer 16 has a trapezoidal prismatic profile as described hereinafter in greater detail. As is explained in detail in the aforementioned U.S. Pat. No. 4,917,477, the electrochromic layer 18 includes a substance 19 having the desired electrochromic properties. Transparent conductive layers 21 and 22 are connected to an electrical circuit at terminal points 23 and 24, respectively.

In the operation of the mirror 10, the light ray 1 enters through the front cover glass 17, the transparent conductive layer 21, the electrochromic layer 18, the transparent conductive layer 22, and the mirror glass layer 16 before being reflected from the reflective layer 14 provided on the mirror glass layer 16. Light in the reflected ray 2 exits by the same general path traversed in the reverse direction. Both the ray 1 and the reflective ray 2 are attenuated in proportion to the degree to which the electrochromic layer 18 is light absorbing. The angle of the prism is preferably great enough to allow the rays 3, 4 and 5, which are reflected from different surfaces of the mirror structure other than the reflective layer 14, to be reflected up toward the roof of the automobile instead of toward the eyes of the driver. Only the ray 2 reaches the driver's eyes. The light ray 1 makes one pass through the attenuating layer 18 before being reflected by the reflective layer 14 as the ray 2. The ray 2 then makes a pass through the attenuating layer 18 before being viewed by the driver. Since the rays 3, 4 and 5 are directed away from the driver, the ray 2 is the only light viewed by the driver. It should be noted that the light in the ray 2 has made two passes through the attenuating electrochromic layer 18.

Figure 1:
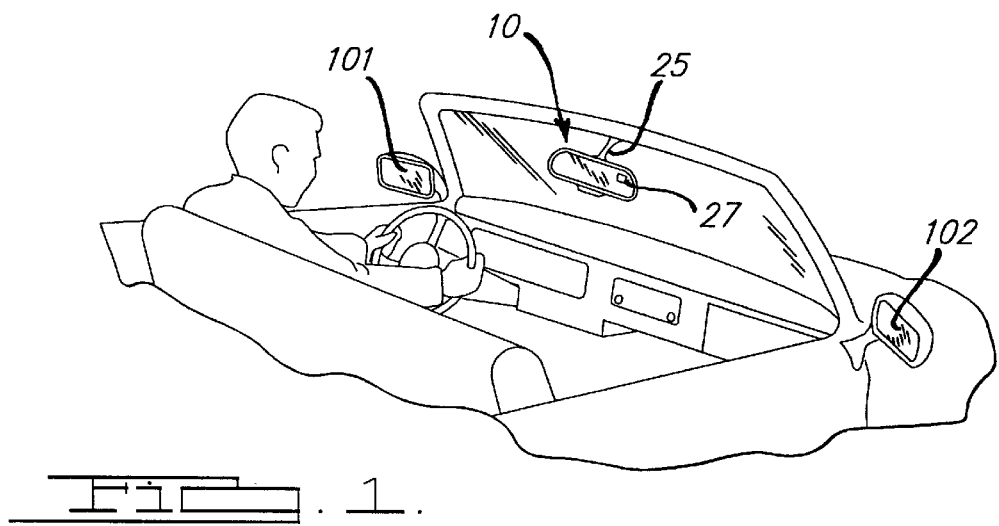
FIG. 1 is a highly schematic view of the interior of an automotive vehicle.

In this particular embodiment, a surface area 26 of the reflective layer 14 of the mirror 10 is removed so that no reflective capability exists in the aforementioned surface area. A light-emitting information display module 13 having information displayed on its front face 27 is oriented so that the front face 27 abuts against the surface area 26 whereby the information 28 is visible to the vehicle operator through the glass layer 16, the electrochromic layer 18 and the front cover glass 17. Such an information display module 13 can be an electronic compass of the type referred to in U.S. Pat. No. 4,425,717, where the flux gate sensor is mounted in the mounting system 25 (FIG. 1) for the rearview mirror 10 mounted to the vehicle windshield. The controlling electronics 34 (FIG. 4) for the compass can be any of those disclosed in U.S. Pat. Nos. 4,505,054; 4,546,551; 4,677,381 and 4,953,305. The previously mentioned five patents, all owned by Prince Corporation of Holland, Mich., are to be considered incorporated herein by reference.

Referring to the circuit block diagram of FIG. 4, one or more electrochromic mirrors 10, 101 and 102 are used as the inside rearview mirror and the left outside and the right outside mirrors, respectively, of a vehicle. These mirrors are supplied with approximately 1.2 volts to darken them and are short circuited to clear them rapidly. It has been found that the mirrors 10, 101 and 102 clear within about 20 seconds when open circuited. The electrical supply 119 for the mirrors 10, 101 and 102 is connected to the conventional 12.8 volt automotive supply which is turned on by the vehicle ignition switch. The supply circuit 119 limits supply voltage transients and regulates the supply voltage to a portion of the system.

The backward facing sensor circuit 12 senses light rays 107 from the headlamps of the vehicle 106 generating an electrical signal indicative of the glare producing light from the rear.

The forward facing sensor circuit 11 senses the ambient light rays 105 to the front of the vehicle, while the visor 112 shields the sensor from the rays 104 of street lamp 103 which is nearly overhead. The purpose of the forward sensing circuit 11 is to respond to ambient light in much the same way as the driver's eyes respond and to establish the operating threshold of the mirror accordingly.

For ambient light level less than 0.02 foot candles, the actual ambient light level has very little effect on the driver's perception of glare. The minimum light threshold circuit 113 causes the output of the forward facing circuit 11 to approach a constant value for light levels which are less than 0.02 foot candles. A time average of about 25 seconds is applied to the forward light signal by a long time average circuit 114 to produce a time averaged ambient light reference signal against which the signal from the backward facing sensor circuit 12 is compared. This time average stabilizes the reference signal and causes it to track the slow response of the human eye to changing light levels. A comparator circuit 118 is provided which signals a glare condition when the signal from the backward facing sensor circuit 12 indicates a glare light level which exceeds the reference level established by the time averaged forward signal.

Several other signals combine to override the glare determination and to hold the mirrors 10, 101 and 102 in the bright condition. First, a day detector circuit 115 compares the forward signal against a fixed threshold equivalent to approximately two foot candles and holds the mirrors in the bright condition when the forward light level exceeds this threshold. Second, a vehicle backup detect circuit 116 monitors the backup light signal, which indicates that the vehicle is in reverse gear, and hold the mirrors in the bright condition to improve visibility when the vehicle is in reverse gear. Third, a power supply over voltage detection circuit 117 is provided which holds the mirrors in the bright condition when the automotive supply voltage exceeds a safe operating range for circuit components.

Signals are added together at 121 to command the dim state whenever the glare condition is detected and none of the three inhibiting conditions is present. The mirror supply circuit 124 operates in conjunction with the current limit circuit 122 and voltage limit circuit 125 to supply approximately 1.2 volts to the mirrors 10, 101 and 102 to cause them to assume the dim state. The mirrors return spontaneously to their bright states within approximately 20 seconds of the time that the 1.2 volt supply is removed. The mirror shorting circuit 123 short circuits the inputs to the mirrors to speed their return to the bright state.

In operation, it is normal for the command signal from 121 to change frequently between commanding the bright and the dim mirror states. The mirrors respond rapidly enough to the dim command that the driver is normally not bothered by excessive glare. The natural delay of the mirrors in returning to their bright states prevents the annoying and disorienting changes in mirror brightness which is associated with other fast responding mirrors when driven by the simplified control circuit. Furthermore, most other mirrors have short periods of unusability or of high distortion during their transition. For example, most liquid crystal display mirrors scatter light for about one half second following a transition, while a two position prism mirror is misnamed while traveling from one position to another. In contrast, the electrochromic mirror assumes intermediate reflectance and remains useable during all stages of the transition.

Figure 2:
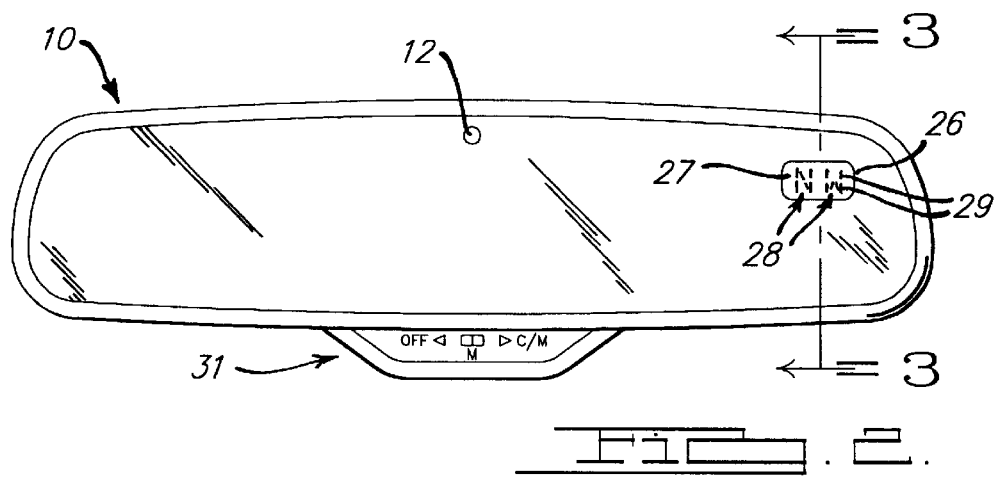
FIG. 2 is an enlarged front view of the interior rearview mirror assembly within the automobile.

A switch 31 (FIG. 2) is located along the bottom edge of the mirror assembly 10 to allow the operator to choose between an "OFF" position which deactivates the automatic glare control feature of the electrochromic mirror and a mirror position M with automatic glare control. If, in this particular embodiment, the lighted information display module 13 is a compass of the type mentioned above, the compass or other electronic module can be activated via the same switch to the "C/M" position as shown in FIG. 2 while retaining the automatic glare control feature. The information 28 is in the form of plural green light emitting members 29, namely, variable intensity vacuum fluorescent elements which are separately controlled and are organized into a pattern so that when they are appropriately lighted, they display a letter or letters or degrees on a compass indicative of the direction of travel of the vehicle. During night mode, these light emitting elements can have their intensity adjusted over a range to a minimal intensity of, for example, 20% of full brightness to allow the driver's non-distraction of the readout. This, however, creates difficult viewing of the display during glare conditions since the electrochromic layer will be appropriately controlled to absorb light both coming from the headlights of the next following vehicle, but also from the light being emitted by the light emitting elements 29 of the information display 28. This particular problem was overcome by the following design improvements.

Figure 6:
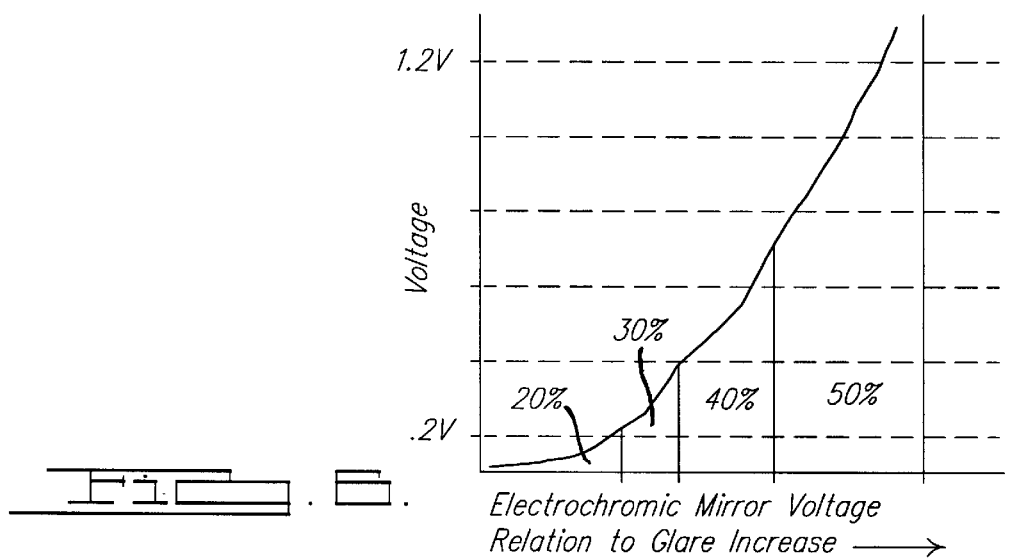
FIG. 6 is a graph illustrating the relationship of the voltage applied to the electrochromic layer of the mirror construction as glare conditions, viewed by the vehicle driver, increase.

Vacuum fluorescent light is transmitted normally through the electrochromic layer and during a maximum glare condition, the electrochromic layer 18 attenuates the light emitted from the vacuum fluorescent display about 7 to 1. This attenuation is minimized because both the vacuum fluorescent display emitted light passes through the absorbing electrochromic layer only one time versus two times for reflected light and the green spectral emission curve for the vacuum fluorescent display peaks at a wave length near the minimum in the visual spectral absorption curve for the electrochromic layer. Even with the reduced attenuation through the electrochromic layer, a problem still exists in that the readability of the display during night glare situations is problematic at best. The combination of the 7 to 1 attenuation and the front cover glass 17 reflection of that light will wash out the readout viewing to the operator. This circumstance makes even the green vacuum fluorescent display difficult to read and, as a result, the adjustable display intensity must compensate for the electrochromic layer attenuation by an amount of the increasing glare caused by the headlights of the next following vehicle. This compensation is in the form of a level intensity control circuit 32 in FIG. 4 which monitors the electrochromic layer voltage and sends a monitored electrochromic layer voltage signal to a display driver 33 to increase the display intensity according to the amount of glare relief that is present. As shown in FIG. 6, the amount that the vacuum fluorescent display intensity increases, from a minimum of 20%, is not to a full 100% brightness level during glare conditions, because that particular level of brightness becomes distracting to the operator. Thus, for example, a 50% level of full brightness was arbitrarily selected as the maximum brightness level for the display intensity.

Figure 7:
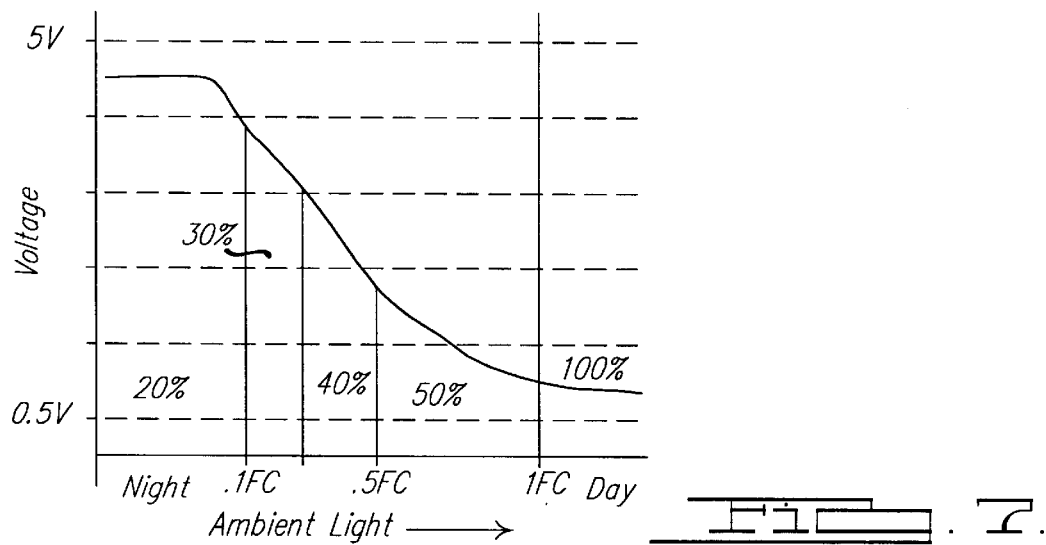
FIG. 7 is a graph depicting the voltage level produced by an ambient light level sensing device.

As shown in FIG. 7, the amplified photocell voltage versus ambient light is displayed, the steps for the vacuum fluorescent display intensity being shown in percentages of full 100% brightness. Actually, the number of steps can be arbitrarily selected. However, experimentation reveals that five steps of 20%, 30%, 40%, 50% and 100% as shown in FIG. 7 are sufficient to permit the dimming and brightening function from being distracting to the vehicle driver. The left scale is the voltage detected across the forward looking photocell in the forward facing sensor circuit 11. The forward looking photocell is low resistance when light is applied to the photocell and resistance increases as light decreases. Therefore, the voltage across the photocell will increase as ambient light decreases. The photocell voltage varies in tenths of a volt and is scaled up by a factor of 18 and is clamped at 4.7 volts maximum, in this particular embodiment. This expands the voltage range out during dawn and dusk light level changes. This photocell scaler is depicted in FIG. 4 by the photocell scaler block 36. The scaled voltage is applied to an analog to digital microprocessor 37 which converts the voltage to the appropriate display intensity control operating in accordance with the level of ambient light as depicted in FIG. 7. Generally, as ambient light decreases to the driver's eyes (or voltage across the forward looking photocell increases), the display intensity of the vacuum fluorescent display in the information display module 13 will decrease in steps of percentage relative to full brightness. Thus, the vacuum fluorescent display of the information display module 13 will diminish as the surrounding ambient light decreases to the vehicle operator.

When the vehicle ignition is initially activated to turn-on the vehicle, the front looking photocell resistance will already be determined and, as a result, the appropriate brightness or dimness level of the vacuum fluorescent display will instantly appear to the driver. For example, time averaging is provided in the microprocessor 37. This allows the display to come up to the level determined by the actual ambient light conditions at turn-on of the vehicle. If the vehicle is in a garage or other dark location at turn-on, the display will be at 20% of full brightness intensity. On the other hand, if the vehicle is located in a daylight location, the intensity level will be at the 100% intensity level. The microprocessor program in the microprocessor 37 will start time averaging about ten (10) seconds after vehicle turn-on.

Figure 5:
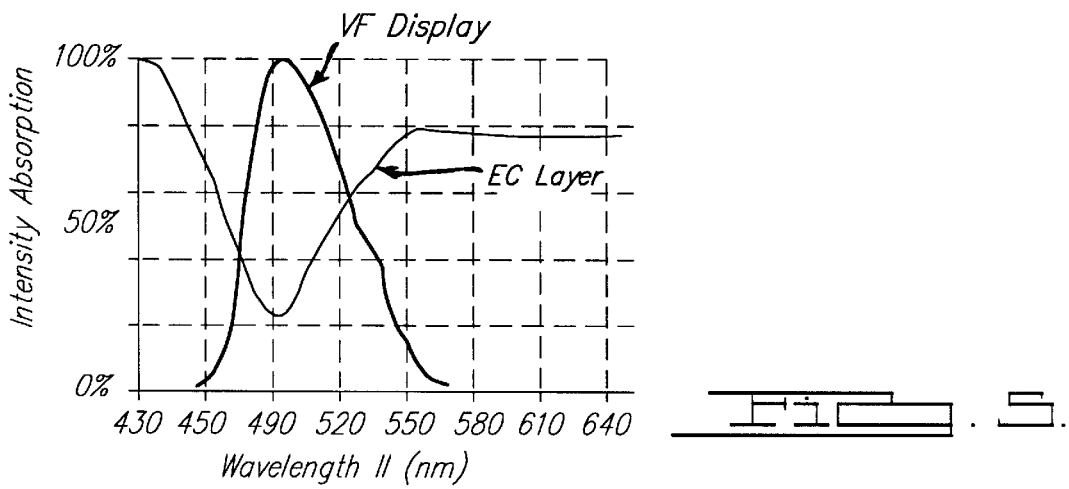
FIG. 5 is a graph depicting the level of light intensity absorption by an electrochromic layer as compared to the wave length of the light signal being absorbed.

During normal operation of the mirror 10 and, more particularly, operation of the electrochromic layer 18 in association with the mirror 10, reflectivity of the mirror will go from 80% reflectivity down to approximately 6% of full reflectivity as glare increases. FIG. 6 is a graph showing the relationship between glare and the voltage across the electrochromic layer 18. The voltage from the mirror drive circuit increases because of the glare from the headlights of the next following vehicle detected by the rear looking photocell 12. Under a normal circumstance, the vacuum fluorescent display 28 of the information display module 13 would be attenuated by a factor of about 4 to 1 as shown in FIG. 5. Thus, the vacuum fluorescent display must increase in intensity in order to overcome the is attenuation by increasing the output intensity by a factor of about 3 to 1. The rest of the light spectrum would be absorbed greater than 10 to 1 for the first pass through the electrochromic layer, or 100 to 1 to the driver's eyes.

Figure 8:
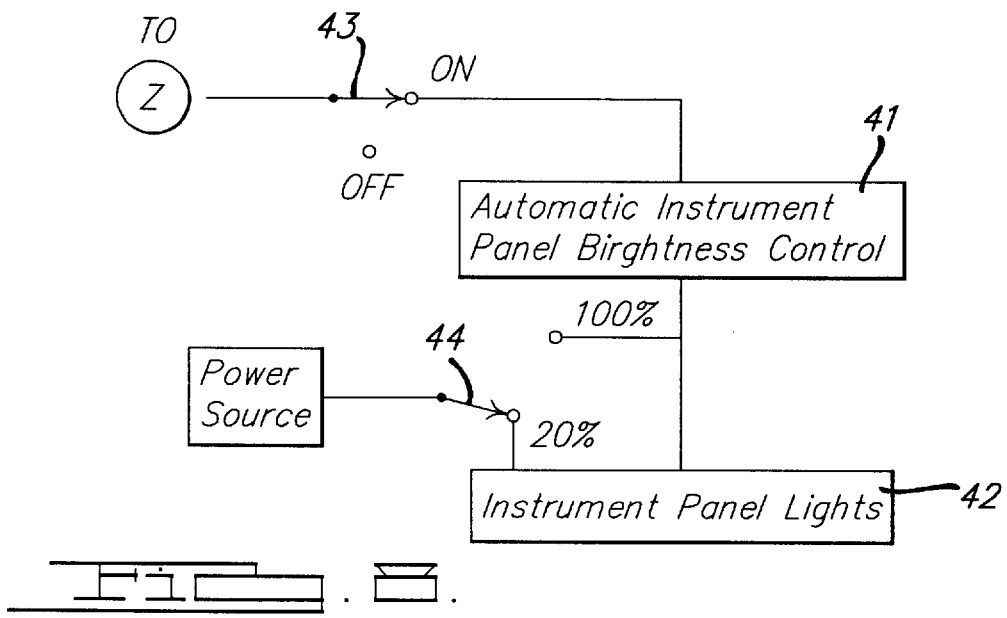
FIG. 8 is a schematic block diagram of an auxiliary system for controlling the intensity of the light emitting elements of a vehicle instrumentation system.

FIG. 8 illustrates a block diagram of a further modification to the circuit diagram illustrated in FIG. 4. As the ambient light level reduces, dawn or dusk conditions will likely cause the vehicle driver to keep the headlights ON (during dawn conditions) or turn the headlights ON (during dusk conditions). Conventional circuitry is employed as the headlights are ON to dim the display intensity of the light emitting elements of instrumentation 42 on the vehicle. Generally, the intensity level is reduced to a factor of about 20% of full brightness while the headlights of the vehicle are in the ON condition determined by a switch 43. It is a further improvement of this invention to utilize the existing continuous monitoring of the ambient light level condition by the forward looking photocell, which condition is also indicative of the output at the photocell scaler 36, and feeding the electrical signal so provided to a further control circuit 41 for providing a proportionate signal to vary the light intensity of the light emitting elements on the instrumentation as a function of the detected ambient light level. In other words, rather than having just one brightness level for the light emitting elements on the vehicle instrumentation panel, a gradual dimming of the light intensity of the light emitting elements of the instrumentation will be caused by the circuitry provided in the control 41 in response to a lessening of the ambient light, that is, the light emitting elements will be gradually dimmed from 100% of full brightness as ambient light levels dim until the intensity of the light emitting elements of the vehicle instrumentation are at 20% of the full brightness value so that such reduced brightness level will not be distracting to the vehicle driver during periods of time of reduced ambient light, such as during nighttime driving. A switch 44 can be utilized to deactivate the control circuit 41.

Figure 9:
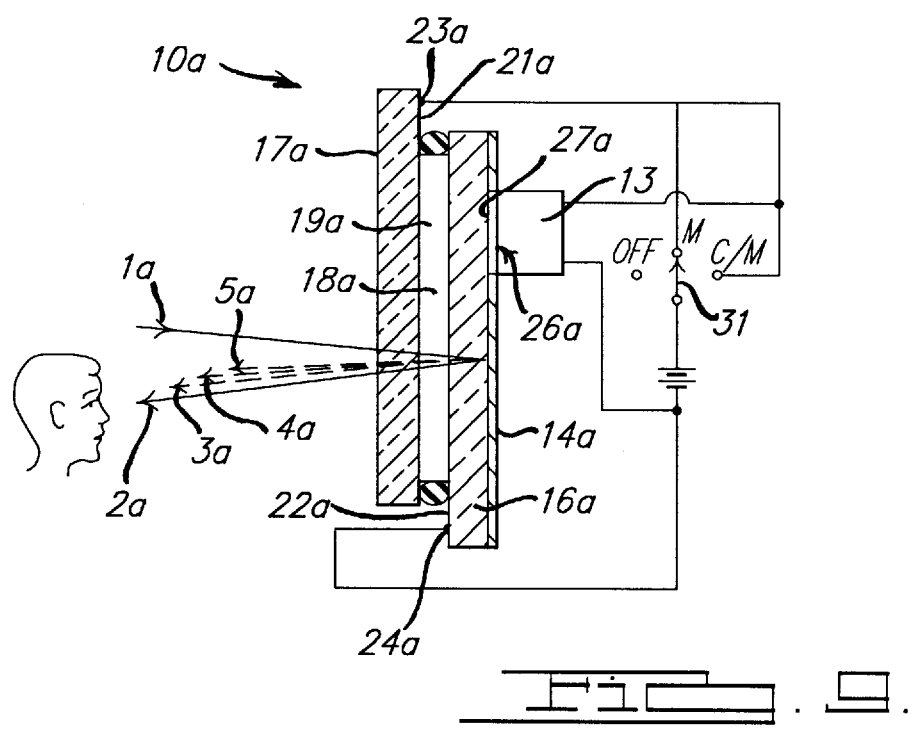
FIG. 9 is a schematic sectional view of another embodiment of the invention.

FIG. 9 illustrates an alternative mirror assembly 10a of this invention. Mirror 10a includes the majority of the same components as in mirror 10 illustrated in FIG. 3. The difference between the mirror 10a and the previously described mirror 10 is that mirror 10a includes a mirror glass layer 16a that has a rectangular cross-sectional profile. In the embodiment of the invention illustrated in FIG. 9, the light ray la enters through the front cover glass 17a, the transparent conductive layer 21a, the electrochromic layer 18a, the transparent conductive layer 22a, and the mirror glass layer 16a before being reflected from the reflective layer 14a provided on the mirror glass layer 16a. Light in the reflected ray 2a exits by the same general path traversed in the reverse direction. Both the ray la and the reflective ray 2a are attenuated in proportion to the degree to which the electrochromic layer 18a is light absorbing. In the FIG. 9 embodiment of the invention, the vehicle driver views the rays 2a, 3a, 4a and 5a which are reflected from different surfaces of the mirror structure. When the mirror structure is thin and when the layers are parallel, this causes very little problem. However, with wider separation of the surfaces and with slightly nonparallel surfaces, multiple imaging may become a problem, and in order to eliminate multiple imaging, the prism structure of FIG. 3 may be used, the structure of the prism mirror of FIG. 3 being substantially the same as that of the mirror of FIG. 9 except for the prism shape of the glass layer 16.

FIG. 10 is a schematic and block diagram depiction of an alternative control circuit 202 for both regulating the optical transmissivity of the electrochromic layer 18 of the mirror 10 and the intensity of the display generated by information display module 13. Control circuit 202 includes an ambient light sensing circuit 204 that monitors the real-time ambient light conditions in the vicinity of the vehicle and, in response to those conditions, generates an ambient light signal. A long time averaging circuit 206 receives the ambient light signal and produces an averaged ambient light signal representative of the averaged ambient light level. A glare light circuit 208 is configured to monitor the light directed at the vehicle from behind the vehicle. Glare light circuit 208 is further configured to compare the rearward-originated light to the averaged ambient light signal and, in response to this comparison, to generate a glare light signal representative a glare-causing light in the vicinity of the vehicle.

The average ambient light signal and the glare light signal are both applied to a mirror element drive circuit 210. Mirror element drive circuit 210, in response to the applied signals, selectively generates a variable voltage DC signal to the mirror electrochromatic layer 18 in order to adjustably set the optical transmissivity of the electrochromatic layer. Control circuit 202 further includes a glare override subcircuit 212 that monitors the ambient light and the vehicle's own components, such as its backup lights, that may cause a false positive reading regarding glare conditions. Depending on the status of the parameters monitored, the glare light override circuit 212 selectively inhibits the dimming of the mirror when the glare false positive condition occurs.

Control circuit 202 includes the photoscaler 36, microprocessor 37, and display driver 33 previously described with respect to FIG. 4. Photoscaler 36 is connected to the ambient light sensor 204 to receive the ambient light signal and produce a scaled ambient light signal therefrom. Microprocessor 37 is connected to the mirror element drive circuit 210 to receive the mirror element drive signal as well as to the photoscaler 36 to receive the scaled ambient light signal. Based on the magnitudes of these two signals, microprocessor 37 generates command signals to display driver 33 so as to cause the driver to generate energization signals that cause image of appropriate intensity to be generated by the vacuum fluorescent display 28.

Control circuit 202 includes a mirror terminal T251 that is connected to the 12.8 volt automotive supply which is switched by the vehicle ignition switch. A terminal T252 is connected to ground and a terminal T253 is connected to the back-up light circuit. A potentiometer R263 is a sensitivity adjusting rheostat which is optionally accessible to the driver. A supply voltage V252 is maintained by current from the current limiting resistor R251 which is tied to terminal T251. A Zener diode D251 conducts to clamp the voltage V252 at 9.1 volts relative to a V261 ground voltage. A capacitor C251 connected between terminal T252 and resistor R251 functions as filter capacitor to hold a voltage V252 steady. Voltage V252 functions as a positive operational amplifier circuit supply; ground is the negative operational amplifier circuit supply; and a voltage V253 is the operational amplifier common or reference voltage. All voltages in the description which follows are referenced to voltage V253. A set of series-connected resistors R252, R253, R274, and R254 extend between R251 and terminal T252. Resistor R252 can be adjusted to set V253 to a desired voltage relative to V252 and V261. The resistor R252 is adjusted so that V261 is −2.8 volts. A diode D252 and a resistor R269 are series connected between terminal T251 and the mirror drive circuit 210. Diode D252 blocks reverse current flow from the drive circuit 210. Operational amplifier reference voltage V253 is taken off the junction between resistors R253 and R274. A day detect signal V262, to be discussed hereinafter, is taken off the junction of resistors R274 and R254. Resistor R269 limits current to the drive circuit. A capacitor is C255 connected across the mirror drive circuit 210 limits voltage transients to the drive circuit. A capacitor C252 connected across resistors R274 and R254 limit transients in voltage V253.

Ambient light sensing circuit 204 consists of an operational amplifier AMP25 1, a resistor R255 is connected between resistor R251 and the inverting input of the amplifier and a resistor R256 through which voltage V253 is applied to the noninverting input of the amplifier. A capacitor C253 is connected the V+ and V− power pins to amplifier AMP253. The light sensing element of circuit 204 is a cadmium sulfide resistor R257 that is connected as a feedback member between the output of amplifier AMP251 and the inverting input. Amplifier AMP251 supplies a constant current to the sensor resistor R257. The level of the current is established by resistor R255 which has a voltage V252 across it.

V254=−V252*R257/R255
Since for the conductance G257 of R257,
1/G257=R257,
V254=−V252/(R255*G257).

Thus voltage V254 functions as the variable voltage ambient light output signal.

Long time averaging circuit 206 includes an operational amplifier AMP252, a resistor R258 connected between resistor R257 and the inverting amplifier and a resistor R259 which supplies voltage V253 to the noninverting input of the amplifier. Averaging circuit 204 further includes a capacitor C254 and a resistor R260 which are both connected in parallel across the output of amplifier AMP252 and its inverting input. In one version of the invention, R260 and C254 are selected so that they form a long time averager of the V254 signal applied into AMP252. In one preferred version of the invention, R260 and C254 are selected so that an output signal V255 is produced which represents approximately a 22 second time average of ambient light signal V254.

Glare light circuit 208 includes a cadmium sulfide photosensitive resistor R261 connected at one end to receive averaged ambient light signal V255. The opposed end of resistor R261 is connected to the inverting input of an operational amplifier AMP253. Voltage V253 is supplied to the noninverting input of AMP253 through resistor R271. Resistor R262, R263 and R282 are series connected between the inverting input of amplifier AMP253 and the amplifier output. Diodes D253 and D254 are connected in series across resistor R282. Voltage V253 is applied to diode D253 through resistor R281. Resistor R263 is adjustable having a center tap that is connected to the junction of R263, R281, R282 and D254. The adjustability of R263 allows the driver to selectively establish the glare sensitivity of circuit 208.

Resistor R271 limits the gain of the circuit of amplifier AMP253 when the high illumination reduces the resistivity of photosensitive resistor R261. This prevents the mirror from coloring during normal daylight conditions and does slightly decrease the sensitivity of the mirror in high ambient light situations. During normal night driving, the resistance of the sensor R261 is so high that the resistor R271 can be neglected. The resistor R271 is neglected and the optional shaping formed by R281, R282, D253 and D254 can be omitted for the equations which follow.
Let
RF=R262+R263.
Then
V256=−V255*RFIR261. Since for the conductance
G261 of G261
G261=1/R261,
V256=−V255*RF*G261.
Since G261 is approximately proportional to the measured glare causing light level, glare light signal V256 is approximately proportional to the product of the measured glare multiplied by the time average of the reciprocal of the ambient light level. Resistance factor RF includes the sensitivity adjusting rheostat R263 and is a factor in the expression for glare light signal V256. Thus, theostat R263 scales glare light signal V256 to the desired level so that −0.6 volts represents the onset of glare. When the glare causing light level is low, the resistance of the sensor R261 is high and the gain of amplifier AMP253 circuit low. In this situation glare light signal V256 is approximately 0 volts. As the glare causing light increases, V256 becomes increasingly negative.

Mirror element drive circuit 210 includes an operational amplifier AMP254 connected to receive glare light signal V256 through resistor R264 and its inverting input. A PNP transistor Q251 has its emitter tied to receive voltage V253. The collector of transistor Q251 is tied to terminal T252 through series connected resistors R267 and R268. Glare light signal V256 is applied to the base of transistor Q251 through resistor R266. The base of transistor Q251 is tied to ground through a resistor R280. A collector voltage signal V258 taken the junction of resistors R267 and R268 is applied to the noninverting input of amplifier AMP254.

The output signal from amplifier AMP264 is also applied to the base of an NPN transistor Q253. The collector of transistor Q251 is tied to the 12.8 voltage supply through resistor R269. The emitter of transistor Q253 is tied to the ground terminal T252 through R270. Capacitor C255 ties the collector of transistor Q253 to the ground terminal. A resistor R265 connects the inverting input of amplifier AMP264 to the junction of transistor Q253 and resistor R270. The voltage at this point is applied to mirror electochromatic element 18 as the mirror drive voltage V259.

When V256 is about −0.6 volts, transistor Q251 turns on pulling V258 from −2.8 volts to −1.9 volts. The mirror voltage (V259-V261) increases to about 0.45 volts and begins to reduce the reflectivity of the mirror. As glare increases further, V256 decreases toward the −2.8 volt negative supply. Consequently, amplifier AMP254 in conjunction with the summing resistor R264, feedback resistor R265 and emitter follower output stage Q253 increase the voltage (V259-V261) to about 1.0 volts. This drives the mirror electrochromatic layer 18 to its minimum optical transmissivity and the mirror to its minimal reflectivity.

When glare decreases, V256 becomes less negative, and the mirror voltage (V259-V261) decreases. With a large enough decrease in the mirror voltage, the charge stored in the mirror discharges through the resistor R270. The value of the resistor R270 is chosen to establish the desired clearing rate of the mirror. This rate decreases by about two to one as the resistance of the resistor R270 is increased from a low to a high value. Thus, the mirror element drive circuit 210 applies a continuously variable voltage to the mirror electrochromatic layer 18 to establish the optical transmissivity of the mirror as a function of the glare-causing light to which the mirror 10 is exposed.

Glare override circuit 212 includes an NPN transistor Q252 the base of which is connected to receive the tail light status signal through terminal T253 and resistor R273. A resistor R272 ties the base of transistor Q252 to ground. Circuit 212 further includes an operational amplifier configured to operate as a comparator COMP251. The inverting input of COMP251 is connected to photosensitive resistor R257 to receive the ambient light signal V254. The noninverting input of COMP251 is connected to receive the day detect signal V262. The output of comparator COMP251 is tied to both the collector of transistor Q252 and the junction between R267 and R68. A resistor R272 is tied between the base of transistor Q252 and ground. The emitter of transistor Q252 is tied directly to ground.

When the back-up lights are on, the voltage at T253 causes the resistor R273 to conduct so as to turn on transistor Q252. This pulls the voltage V258 at the noninverting input of operational amplifier AMP254 low. This causes the mirror drive voltage (V259-V261) to drop, all allowing the mirror electrochromatic layer 18 to clear. Alternatively, when the ambient light is above a selected level, in some versions of the invention, above one foot candle, the ambient light signal V254 applied to the inverting input of COMP251 will exceed the day detect signal V262 applied to the noninverting input. Once this occurs, the output from COMP251 will swing negative and pull the V258 low. This likewise inhibits mirror element drive circuit 210 from applying an optical transmissivity reducing voltage to mirror electrochromatic layer 18.

Diodes D253 and D254 and resistors R283, R281 and R282 are component s of an optional shaping network modification. The diodes D253 and D254 are replaced by shorts when not used and the other components are open circuited when not used. The modification is used to characterize the shaping network for use with a glare causing light sensor which views light directly rather than after it has passed through the attenuating layer of the mirror. The resistor R280 makes the ba se of the transistor Q251 more negative turning on the transistor Q251 for smaller negative excursions of V256. For small negative excursions of V256, the diodes D253 and D254 do not conduct significantly allowing the ratio of (R281+R282) to R281 to increase the gain of the operational amplifier AMP253. As V256 becomes increasingly negative the diodes D253 and D254 conduct shunting out the resistor R282 and decreasing the gain of the operational amplifier AMP253. The combined effect of this decrease in gain for larger negative excursions of V256 and of the more sensitive threshold of the transistor Q251 is to require a greater percentage change in the glare causing light level which strikes the glare causing light sensor to drive the mirror from its full bright to its full dark state. Such an increase is required to substitute for the removal of the attenuating layer of the mirror from the light path to the glare causing light sensor.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An electronic control system for controlling the reflective state of an automatic rearview mirror for an automotive vehicle, said system including a rearview mirror comprising an electro-optic variable reflectance mirror element the reflectivity of which varies over a reflectance range as a function of electrical signals applied thereto, said rearview mirror also including a variable luminance light emitting display visible through said electro-optic variable reflectance mirror element, ambient light sensing means effective to sense ambient light levels and to generate an electrical signal indicative of the ambient light level, glare light sensing means effective to sense glare-causing light levels and generate an electrical signal indicative of the glare-causing light level, means responsive to said electrical signals to control both the reflective state of said mirror element and the luminance of said light emitting display whereby the luminance of said display increases as the reflectivity of said electro-optic variable reflectance mirror element decreases and the luminance of said display decreases as the reflectivity of said mirror element increases, and means operable to vary the luminance of said light emitting display directly as a function of the electrical signal indicative of the ambient light level.

2. An electro-optically dimming rearview mirror for automotive vehicles, said mirror comprising, in combination, front and rear spaced elements, said front element and said rear element defining a chamber therebetween, said front element being transparent, the side of said front element confronting said rear element including transparent electrically conductive means, the side of said rear element confronting said front element including electrically conductive means, said rear element also including light reflecting means, said chamber containing an electro-optic reversibly variable light transmittance medium in contact with said transparent electrically conductive means on said front and rear elements, said light reflecting means on said rear element being effective to reflect light through said medium and through said front element when said light reaches said light reflecting means after passing through said medium and through said front element, said light reflecting means defining an opening, light emitting display means visible through said medium and through said opening defined by said light reflecting means, control circuitry including ambient light sensing means effective to sense ambient light levels and to generate corresponding electrical signals indicative of the ambient light levels, said control circuitry also including glare light sensing means effective to detect glare-causing light levels and generate corresponding electrical signals indicative of said glare-causing light levels, said control circuitry also including means operable to apply an electrical potential to said electrically conductive means whereby the light transmittance of said medium is varied as a function of the ambient light levels and the glare-causing light levels, means operable to vary the luminance of said light emitting display inversely with respect to variations in the light transmittance of said medium whereby the luminance of said display increases as the light transmittance of said medium decreases and the luminance of said display decreases as the light transmittance of said medium increases, and means operable to vary the luminance of said light emitting display directly as a function of the electrical signals indicative of the ambient light levels.

3. An electro-optically dimming rearview mirror for automotive vehicles, said mirror comprising, in combination, front and rear spaced elements, said front element and said rear element defining a chamber therebetween, said front element being transparent, said rear element also including light reflecting means, said chamber containing an electrochromic reversibly variable light transmittance medium, said light reflecting means on said rear element being effective to reflect light through said medium and through said front element when said light reaches said light reflecting means after passing through said medium and through said front element, said light reflecting means defining an opening, vacuum fluorescent display means visible through said medium and through said opening defined by said light reflecting means, control circuitry including ambient light sensing means effective to detect ambient light levels impinging thereon and generate a corresponding electrical signal indicative of said ambient light levels, said control circuitry also including glare light sensing means effective to detect glare-causing light levels impinging upon said light reflecting means and generate a corresponding electrical signal indicative of said glare-causing light levels, said control circuitry also including means operable to apply an electrical potential to said medium whereby the light transmittance of said medium is varied as a function of the ambient light levels and the glare-causing light levels, and means operable to vary the luminance of said vacuum fluorescent display inversely with respect to variations in the light transmittance of said medium whereby the luminance of said display increases as the light transmittance of said medium decreases and the luminance of said display decreases as the light transmittance of said medium increases, and means operable to modify the luminance of said vacuum fluorescent display directly as a function of the electrical signals indicative of the ambient light levels and independently of the electrical signals indicative of the glare-causing light levels.

* * * * *